US009170521B2

(12) United States Patent
Matsumoto

(10) Patent No.: US 9,170,521 B2
(45) Date of Patent: Oct. 27, 2015

(54) LIGHT BEAM DETECTION CIRCUIT, LIGHT BEAM SCAN UNIT AND IMAGE FORMING APPARATUS TO DETECT LIGHT BEAM THAT CHANGES LIGHT-AMOUNT THEREOF

(71) Applicant: Sharp Kabushiki Kaisha, Osaka (JP)

(72) Inventor: Kazutaka Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/369,347

(22) PCT Filed: Dec. 17, 2012

(86) PCT No.: PCT/JP2012/082614
§ 371 (c)(1),
(2) Date: Jun. 27, 2014

(87) PCT Pub. No.: WO2013/099668
PCT Pub. Date: Jul. 4, 2013

(65) Prior Publication Data

US 2014/0363207 A1 Dec. 11, 2014

(30) Foreign Application Priority Data

Dec. 27, 2011 (JP) ................................ 2011-284637

(51) Int. Cl.

| | |
|---|---|
| ***B41J 2/47*** | (2006.01) |
| ***G03G 15/04*** | (2006.01) |
| ***G03G 15/043*** | (2006.01) |
| ***B41J 2/44*** | (2006.01) |
| ***G02B 26/10*** | (2006.01) |
| ***H04N 1/113*** | (2006.01) |
| ***G06K 15/12*** | (2006.01) |
| ***G01J 1/18*** | (2006.01) |
| ***G02B 26/12*** | (2006.01) |

(52) U.S. Cl.
CPC ................ *G03G 15/043* (2013.01); *B41J 2/44* (2013.01); *G01J 1/18* (2013.01); *G02B 26/10* (2013.01); *G02B 26/127* (2013.01); *G06K 15/1219* (2013.01); *H04N 1/113* (2013.01); *G01J 2001/186* (2013.01)

(58) Field of Classification Search
CPC ..... G06K 15/1219; B41J 2/44; G03G 15/043; G02B 26/10; G02B 26/127; G01J 1/18; G01J 2001/186; H04N 1/113
USPC ....................... 347/235; 399/220; 250/201.1; 359/212.2; 372/38.01
See application file for complete search history.

(56) References Cited

FOREIGN PATENT DOCUMENTS

| | | |
|---|---|---|
| JP | 64-9214 | 1/1989 |
| JP | 05-330129 | 12/1993 |

(Continued)

*Primary Examiner* — Julian Huffman
*Assistant Examiner* — Carlos A Martinez
(74) *Attorney, Agent, or Firm* — Keating & Bennett, LLP

(57) ABSTRACT

In order to detect a passage timing of a light beam and to suppress cost, a light beam detection circuit (2) includes a detection signal generation section (34) configured to receive a light beam for scanning of a scanning target (101A) with one optical sensor (10), and generate a detection signal corresponding to an amount of received light; a reference signal output section (44) configured to output a reference signal that is in proportion to a light-amount control signal of a light-emission element (LD1) that emits the light beam; and a synchronizing signal generation section (35) configured to compare a detection signal generated by the detection signal generation section (34) with a reference signal output from the reference signal output section (44) to generate a synchronizing signal to determine a position to start scanning of the scanning target (101A) with the light beam.

14 Claims, 10 Drawing Sheets

(56) References Cited

FOREIGN PATENT DOCUMENTS

| | | | |
|---|---|---|---|
| JP | 05-336330 | | 12/1993 |
| JP | 05336330 | * | 12/1993 |
| JP | 06-031976 | | 2/1994 |
| JP | 06031976 | * | 2/1994 |
| JP | 11-160636 | | 6/1999 |
| JP | 11160636 | * | 6/1999 |
| JP | 2001-281570 | | 10/2001 |
| JP | 2002-113899 | | 4/2002 |
| JP | 2002113899 | * | 4/2002 |

* cited by examiner

LIGHT BEAM DETECTION CIRCUIT, LIGHT BEAM SCAN UNIT AND IMAGE FORMING APPARATUS TO DETECT LIGHT BEAM THAT CHANGES LIGHT-AMOUNT THEREOF

CROSS-REFERENCE TO RELATED APPLICATIONS

This application is a National Phase application filed under 35 USC 371 of PCT International Application No. PCT/JP2012/082614 with an International Filing Date of Dec. 17, 2012, which claims under 35 U.S.C. §119(a) the benefit of Japanese Application No. 2011-284637, filed Dec. 27, 2011, the entire contents of which are incorporated herein by reference.

TECHNICAL FIELD

The present invention relates to light beam detection circuits to detect a passage timing of a light beam for scanning of a scanning target, light beam scan units and image forming apparatuses provided with such a circuit.

BACKGROUND ART

As illustrated in FIG. 1, an electrophotographic type image forming apparatus includes a Beam Detect (BD) sensor on the starting side of a light beam scanning area. The BD sensor is configured to, as a light beam for scanning by a light beam scan unit passes therethrough, output a detection signal of the magnitude corresponding to the amount of received light of the light beam. The light beam scan unit controls a timing to write an electrostatic latent image on a photoreceptor drum in accordance with the detection signal of the BD sensor.

For instance, the light beam scan unit processes a detection signal of the BD sensor with a light beam detection circuit as shown in FIG. 2A. This light beam detection circuit includes a comparator having an inverting input terminal that receives, as an input, a detection signal (voltage V−) of the BD sensor subjected to current-voltage conversion. The comparator has a input terminal that receives, as an input, predetermined voltage V+ as a threshold level (threshold value). As shown in FIG. 2B, the comparator outputs a synchronizing signal when the voltage V− exceeds the voltage V+. Upon detecting a change of the synchronizing signal of the comparator from H level to L level, a control section sets a starting position to write an image.

Some conventional electrophotographic type image forming apparatuses are adapted to change the light amount of a light beam depending on ambient temperature or ambient humidity of the apparatus, a deterioration state of the photoreceptor drums and the like (see Patent Literature 1, for example). Such an image forming apparatus, however, has a problem that a change in the light amount of a light beam causes displacement of a starting position to write an image. For instance, as shown in FIG. 2C, since the magnitude and the tilt of a detection signal (voltage) of the BD sensor differ between the amount of received light of a light beam of 220 μW and 80 μW, the detection timing of the light beams will be different therebetween by about 660 ns. At this time, when the light beam scan speed by the light beam scan unit is 1,612,149 mm/s, then the starting position to write an image will be displaced by as large as about 1.1 mm.

Then, a light scanning recorder conventionally disclosed includes two optical sensors disposed adjacently and compares waveforms output from the two optical sensors, thereby enabling detection of a passage timing of a light beam always precisely without displacement (see Patent Literature 2, for example).

CITATION LIST

Patent Literatures

Patent Literature 1 Patent Application Publication No. H5-330129

Patent Literature 2 Utility Model Application Publication No. S64-9214

SUMMARY OF INVENTION

Technical Problem

The light scanning recorder described in Patent Literature 2, however, requires two optical sensors, meaning an increase in cost of the apparatus.

Then, it is an object of the present invention to provide a light beam detection circuit capable of detecting a passage timing of a light beam precisely and suppressing cost of the apparatus, and to provide a light beam emission unit and an image forming apparatus including such a circuit.

Solution to Problem

A light beam detection circuit of the present invention includes: a detection signal generation section; a reference signal output section; and a synchronizing signal generation section. The detection signal generation section is configured to receive a light beam for scanning of a scanning target with one optical sensor, and generate a detection signal corresponding to an amount of received light. The reference signal output section is configured to output a reference signal that is in proportion to a light-amount control signal of a light-emission element that emits the light beam. The synchronizing signal generation section is configured to compare a detection signal generated by the detection signal generation section with a reference signal output from the reference signal output section to generate a synchronizing signal to determine a position to start scanning of the scanning target with the light beam.

In this invention, it is preferable to use, as the reference signal, a light-amount control signal of a light-emission element that emits a light beam as it is, for example. This can eliminate a circuit to process the light-amount control signal, and so can simplify the configuration of the circuit and can suppress an increase in cost.

A light beam scan unit of the present invention includes: a light beam detection circuit; a control signal generation section; a light source section; a scan section; and a control section. The control signal generation section is configured to generate a light-amount control signal. The light source section is configured to let the light-emitting element emit a light beam of a light amount corresponding to the light-amount control signal. The scan section is configured to scan the scanning target with a light beam emitted from the light source section. The control section is configured to determine a scan starting position of the light beam for scanning by the scan section based on a synchronizing signal generated by the synchronizing signal generation section.

The light beam scan unit preferably includes a detection section. The detection section may be configured to detect ambient temperature or ambient humidity of a main body of the unit. The control signal generation section may generate a light-amount control signal depending on ambient temperature or ambient humidity detected by the detection section.

The light beam scan unit preferably includes a measurement section. The measurement section may be configured to measure the number or time of scans of the scanning target with a light beam by the scan section. The control signal generation section may generate a light-amount control signal depending on the number or time measured by the measurement section.

An image forming apparatus of the present invention includes: the thus configured light beam scan unit; an image forming section; and a fixing section. The image forming section may be configured to supply toner to an electrostatic latent image that is formed on a scanned face of a photoreceptor as the scanning target by scanning with a light beam by the light beam scan unit so as to make the electrostatic latent image visible. The fixing section may be configured to transfer a toner image made to be visible by the image forming section to a recording member and fix the same.

Advantageous Effects of Invention

The present invention enables precise detection of a passage timing of a light beam and can suppress cost of the apparatus.

DESCRIPTION OF EMBODIMENTS

Figure 3:
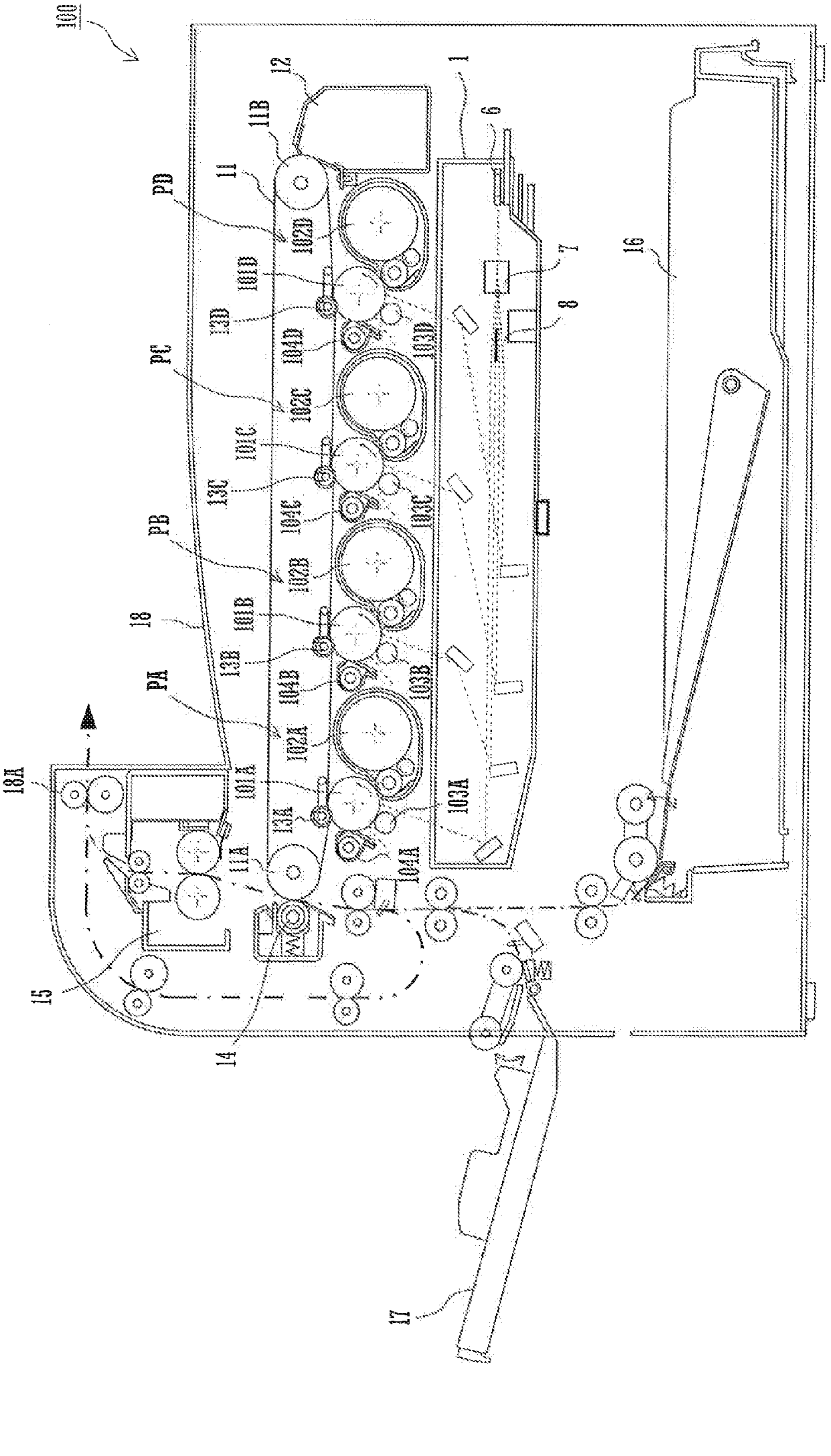
FIG. 3 is a front perspective view showing the internal configuration of an image forming apparatus.

The following describes an image forming apparatus including a light beam detection circuit and a light beam scan unit of the present invention by way of an example of a color printer. As illustrated in FIG. 3, the color printer (hereinafter simply called a printer) 100 includes a light beam scan unit 1, photoreceptor drums 101A to 101D, developing units 102A to 102D, roller charging devices 103A to 103D, cleaning units 104A to 104D, an intermediate transfer belt 11, primary transfer rollers 13A to 13D, a secondary transfer roller 14, a fixing unit 15, a sheet feeding cassette 16, a manual-feed tray 17, an output tray 18 and the like.

Receiving image data transmitted from another device via a network at a not-illustrated communication section, the printer 100 forms an image on a sheet based on this image data.

The printer 100 forms images at image forming units PA to PD based on image data corresponding to four colors including black (K), cyan (C), magenta (M) and yellow (Y), respectively. The image forming units PA to PD have a similar configuration. For instance, the image forming unit PA for black includes the photoreceptor drum 101A, the developing unit 102A, the roller charging device 103A, the transfer roller 13A and the cleaning unit 104A. The image forming units PA to PD are disposed in a line in the traveling direction of the intermediate transfer belt 11.

Figure 5:
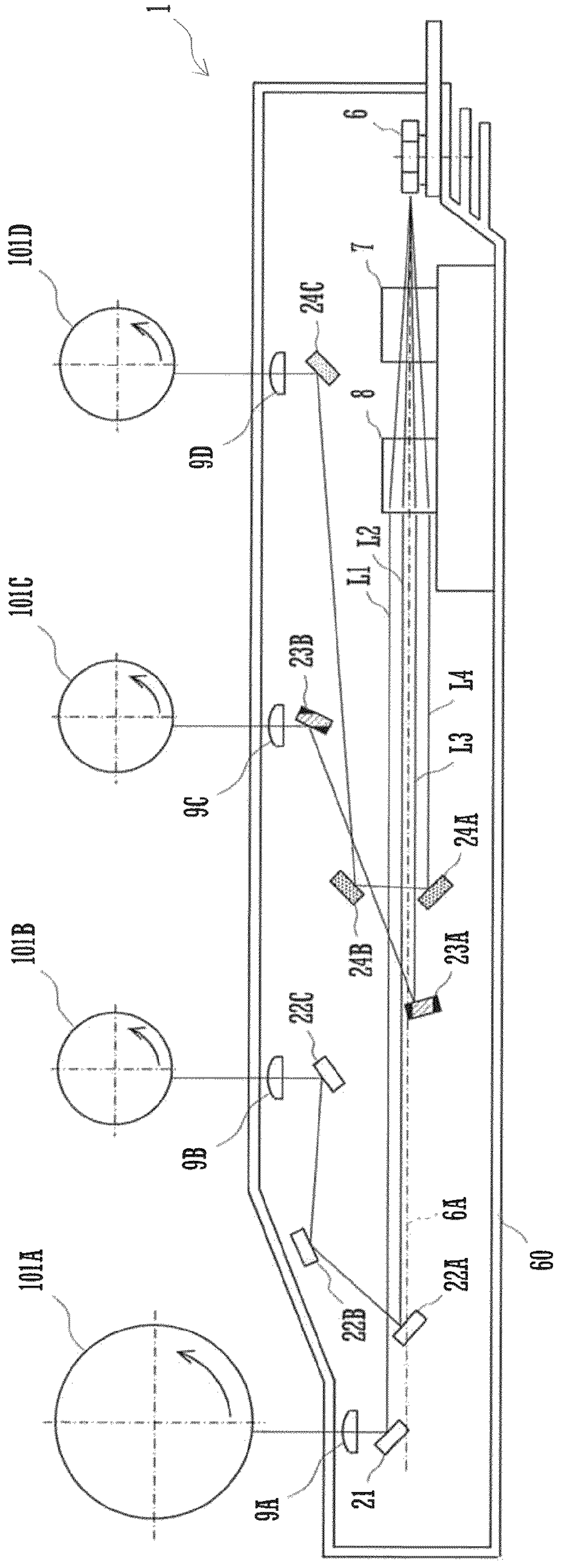
FIG. 5 is a side view showing the schematic configuration of the light beam scan unit.

Although not illustrated in FIG. 3, the photoreceptor drum 101A (black) has a larger diameter than that of other photoreceptor drums 101B to 101D as shown in FIG. 5 described later. This is because a monochrome (black) image is formed more often, and so a longer life is required therefor.

The roller charging device 103A uniformly charges the surface of the photoreceptor drum 101A at a predetermined potential. The other roller charging devices 103B to 103D have a configuration similar to that of the roller charging device 103A.

The light beam scan unit 1 includes a not-illustrated semiconductor laser, a polygon mirror 6, a first fθ lens 7, a second fθ lens 8 and a plurality of mirrors. The light beam scan unit 1 irradiates the photoreceptor drums 101A to 101D as scanning targets with the laser beams that are modulated based on image data of their respective colors. Electrostatic latent images based on image data of the respective colors are then formed on the photoreceptor drums 101A to 101D. The light beam scan unit 1 will be described later in details.

The developing units 102A to 102D store toner of these four colors, respectively, and supply the toner to the electrostatic latent images of the respective colors formed on the photoreceptor drums 101A to 101D to make the electrostatic latent images visible as toner images.

Then the toner images of the respective colors formed on the photoreceptor drums 101A to 101D are transferred to the outer peripheral face of the intermediate transfer belt 11 sequentially in an overlaid manner, whereby a full-color toner image is formed on the outer peripheral face of the intermediate transfer belt 11.

The cleaning units 104A to 104D remove and collect toner remaining on the surfaces of the photoreceptor drums 101A to 101D after such a developing/image transferring step.

As the intermediate transfer belt 11 rotates, the toner image transferred to the outer peripheral face of the intermediate transfer belt 11 is conveyed to a secondary transfer position that is a position opposed to the secondary transfer roller 14.

When a sheet (recording member) supplied from the sheet feeding cassette 16 or the manual-feed tray 17 passes between the secondary transfer roller 14 and the intermediate transfer belt 11, the toner image is transferred to the surface of the sheet from the outer peripheral face of the intermediate transfer belt 11.

The sheet with the toner image transferred thereon is heated and pressurized by the fixing unit 15 as a fixing section, whereby the toner image is fixed firmly on the surface of the sheet. The sheet with the toner image fixed thereon is output to the output tray 18 via an output roller 18A.

The image forming units PA to PD, the intermediate transfer bell 11 and the secondary transfer roller 14 correspond to an image forming section. Hereinafter, this is called an image forming section 82.

Figure 4:
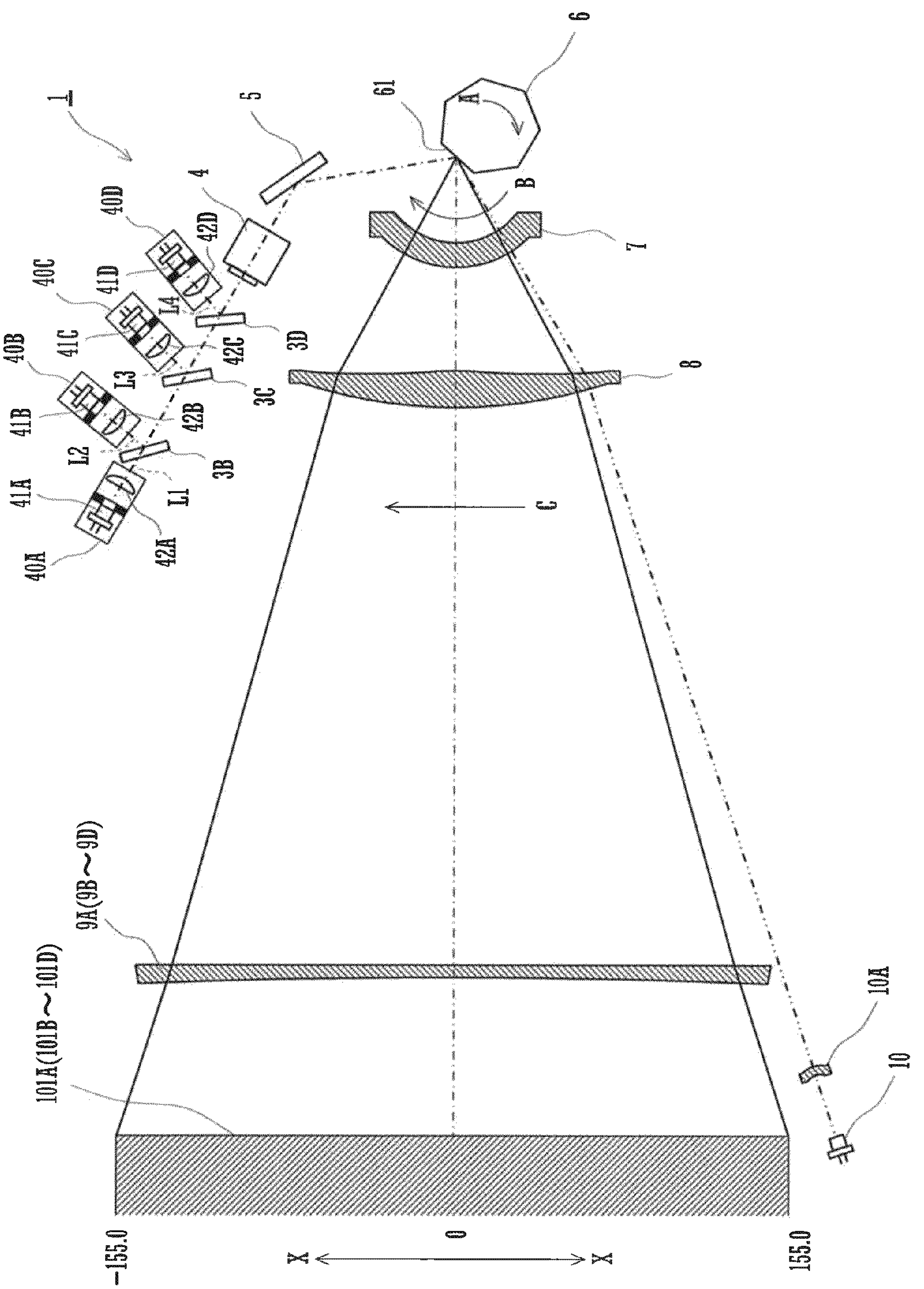
FIG. 4 is a top view showing the schematic configuration of a light beam scan unit.

As illustrated in FIGS. 4 and 5, the light beam scan unit 1 includes optical components such as laser units 40A to 40D, mirrors 3B to 3D, a first cylindrical lens 4, a mirror 5, the polygon mirror 6, the first fθ lens 7, the second fθ lens 8, second cylindrical lenses 9A to 9D, mirrors 21, 22A~22C, 23A, 23B and 24A to 24C, a synchronization lens 10A and the BD sensor 10 as well as a casing 60 to support and store these optical components. The light beam scan unit 1 further includes a light beam detection circuit 2 and a laser driver 43 described later.

The laser unit 40A includes a semiconductor laser 41A that is a light-emitting element capable of freely controlling light emission therefrom and a collimator lens 42A. Similarly, the laser units 40B to 40D include semiconductor lasers 41B to 41D and collimator lenses 42B to 42D, respectively. The arrow X-X in FIG. 4 shows the major scanning direction.

As illustrated in FIG. 4, the semiconductor lasers 41A to 41D as light sources emit laser beams L1 to L4, respectively, that are modulated based on image data of their corresponding colors among the aforementioned four colors. The laser beams L1 to L4 are changed in their spread angles via the collimator lenses 42A to 42D to be parallel light, pass through the mirrors 3B to 3D, the first cylindrical lens 4 and the mirror 5 and enter a reflective face 61 of the polygon mirror 6 at mutually different incident angles.

The polygon mirror 6 rotates in the direction of the arrow A to deflect the laser beams L1 to L4 at its reflective faces 61 in the direction of the arrow B at a constant angular velocity.

The first fθ lens 7 and the second fθ lens 8 deflect the laser beams L1 to L4 that are deflected by the polygon mirror 6 at a constant angular velocity to the surfaces of the photoreceptor drums 101A to 101D, respectively, at a constant velocity in the direction of arrow C in the major scanning direction. This enables scanning of the surface of the photoreceptor drum 101A with the laser beam L1 emitted from the semiconductor laser 41A in the direction of arrow C. Similarly, the surfaces of the photoreceptor drums 101B to 101D are scanned with the laser beams L2 to L4 emitted from the semiconductor lasers 41B to 41D, respectively, in the direction of arrow C.

The mirrors 21, 22A to 22C, 23A, 23B and 24A to 24C in FIG. 5 separate and reflect the laser beams L1 to L4, and so distribute the laser beams L1 to L4 to the surfaces of the photoreceptor drums 101A to 101D, respectively.

The BD sensor 10 in FIG. 4 detects any one of the laser beams L1 to L4 outside the effective exposure area (irradiation area) in the major scanning direction. That is, any one of the laser beams L1 to L4 that are reflected at a reflective face 61 of the polygon mirror 6 forms an image at the light-reception face of the BD sensor 10 via a synchronization lens 10A in the range not reaching the surface of the photoreceptor arum 101A in the major scanning direction. When the BD sensor 10 receives any one of the laser beams L1 to L4, the BD sensor 10 outputs a signal to determine a modulation starting timing for image data of the laser beams L1 to L4 at the semiconductor lasers 41A to 41D.

The polygon mirror 6 reflects the laser beams L1 to L4 so that all of the laser beams L1 to L4 are substantially overlapped at the same reflective face 61. This means that, simply by receiving one laser beam, the BD sensor 10 can control the modulation starting timing for all of the laser beams L1 to L4. Since the BD sensor 10 detects the laser beam L1 to form a black image having the smallest curvature distortion in the scanning line, detection can be performed precisely.

The following describes a control system of the light beam scan unit 1 in the printer 100. The following description exemplifies the image forming unit PA.

Figure 6:
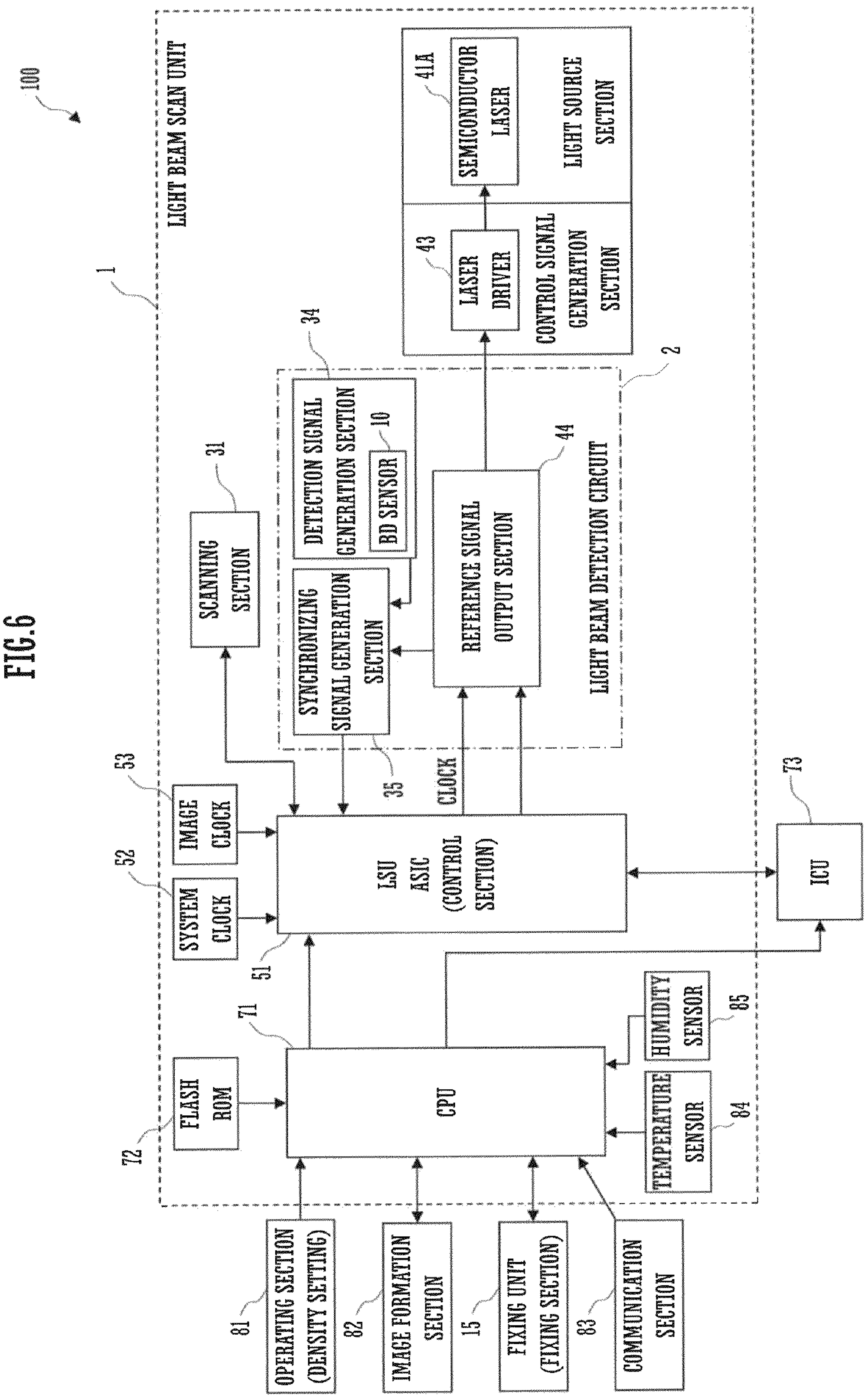
FIG. 6 is a block diagram showing a control system of a light beam scan unit and a control system of an image forming apparatus to control the light beam scan unit.

As illustrated in FIG. 6, the printer 100 includes the light beam scan unit 1, an Image Control Unit (ICU) 73, the image forming section 82, the fixing unit 15 as a fixing section and a communication section 83.

The light beam scan unit 1 includes a scanning section 31, the semiconductor laser 41A as a light source section and the laser driver 43 as a control signal generation section. The right beam scan unit 1 further includes the light beam detection circuit 2, a LSU_ASIC (hereinafter called an ASIC) 51 as a control section, a system clock circuit 52 to supply a system clock signal to the ASIC 51, and an image clock circuit 53 to supply an image clock signal for image formation. The light beam scan unit 1 still further includes a CPU 71, a flash ROM 72, and a temperature sensor 84 and a humidity sensor 85 as a detection section.

The light beam detection circuit 2 includes a detection signal generation section 34, a synchronizing signal generation section 35 and a reference signal output section 44.

When receiving print data via the communication section 83, the CPU 71 transmits this print data to the ICU 73. The print data contains information on print setting and image data to be printed on a sheet.

The CPU 71 makes the temperature sensor 84 and the humidity sensor 85 measure ambient temperature and ambient humidity of the main body of the light beam scan unit.

The CPU 71 corresponds to a measurement section, and manages the deterioration state of the photoreceptor drums 101A to 101D at the image forming section. For instance, the CPU 71 measures the number or the time or scans of each of the photoreceptor drums 101A to 101D with a light beam by the scanning section 31, thus keeping track of the deterioration state of the photoreceptor drums.

The CPU 71 generates a light-amount control signal so as to cause the semiconductor laser 41A to emit a laser beam of the light amount depending on information on ambient temperature or ambient humidity measured and the deterioration state of the photoreceptor drums 101A to 101D, and outputs the light-amount control signal the ASIC.

The ICU 73 is a unit to process an image, and performs various types of image processing to image data transmitted from the CPU 71, such as tone correction or magnification change processing in the units of pages as one document image. Then, the ICU 73 outputs the processed image information to the ASIC 51.

The ASIC 51 operates in accordance with a clock signal output from the system clock circuit 52. The ASIC 51 controls the scanning section 31 in accordance with an image clock signal output from the image clock circuit 53. The ASIC 51 outputs a clock signal to the reference signal output section 44.

The light beam scan unit 1 assigns an address to the scanned face of each photoreceptor drum beforehand to form an electrostatic latent image on the scanned face of each photoreceptor drum by scanning it with a laser beam.

In order to change the light amount of a laser beam in accordance with factors such as the number of scans (scanning time) information of a light beam, ambient temperature information and ambient humidity information as stated above, the flash ROM 72 stores correction values of the light-amount control signal to be output to the laser driver 43 in a not-illustrated table.

The ASIC 51 reads a digital value of the light-amount control signal from the CPU 71 and outputs it to the reference signal output section 44.

The reference signal output section 44 generates control voltage corresponding to the digital value of the light-amount control signal and outputs it to the laser driver 43. Herein the reference signal output section 44 is made up of a D/A converter in one example.

The laser driver 43 controls the semiconductor laser 41A so as to emit a laser beam of the light amount in proportion to the control voltage input from the reference signal output section 44. Since the light amount of the laser beam is in proportion to the control voltage, the light amount of the light beam can be control led precisely and easily by changing the control voltage.

The semiconductor laser 41A emits a laser beam of the light amount that is controlled by the laser driver 43.

The following describes the structure that is a feature of the present invention. In order to solve the conventional problem that the starting position to write an image is displaced with a change in the light amount of a light beam, the present invention changes a threshold level in accordance with the amount or received light of a laser beam of the BD sensor.

Figure 1:
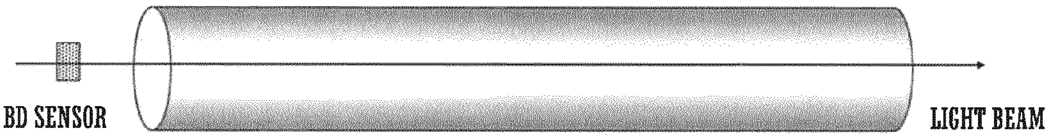
FIG. 1 shows an optical path of a light beam for scanning on a scanned face of a photoreceptor.
Figure 2A:
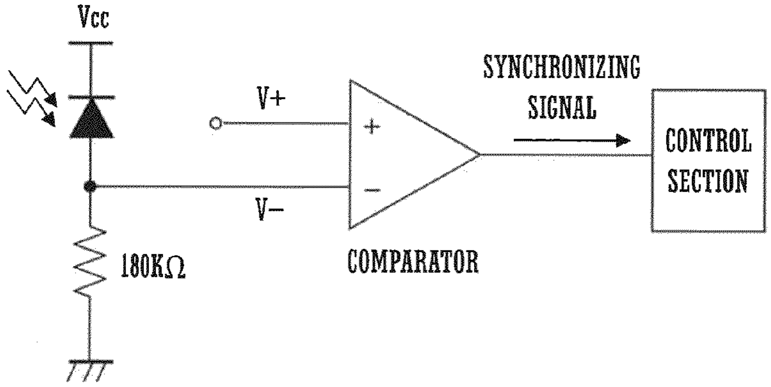
FIG. 2A is a circuit diagram of a conventional light beam detection circuit.
Figure 2B:
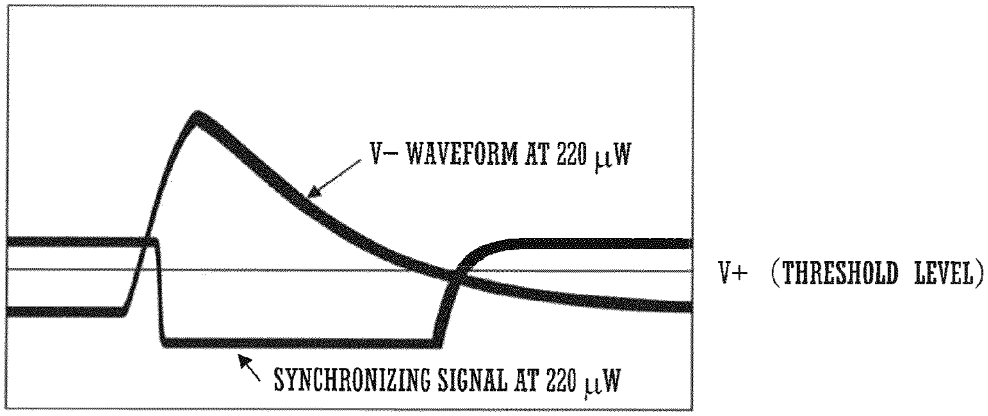
FIG. 2B is a graph to describe a method for detecting a light beam and a detection timing thereof.
Figure 2C:
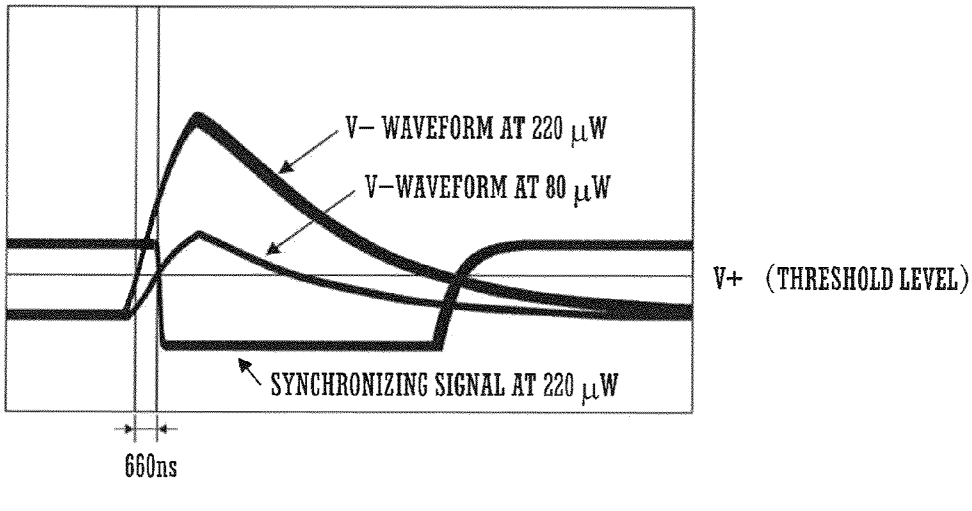
FIG. 2C is a graph to describe a detection timing of a light beam when the light beam has different amounts of light.

FIG. 2C illustrates actual measured values when the BD sensor 10 receives light of the light amount that is up to 220 μW (when the detection signal is large) and when the BD sensor 10 receives light of the light amount that is up to 80 μW (when the detection signal is small). The output signal (detection signal) of the BD sensor 10 has the magnitude in proportion to the amount of received light, and so it increases with proximity to the BD sensor 10, and reaches its maximum when the light beam passes through the center of the BD sensor 10. Then, the output signal reduces with decreasing proximity to the BD sensor 10. Then the threshold level of the present invention is changed in proportion to the amount of received light of the laser beam.

Figure 7:
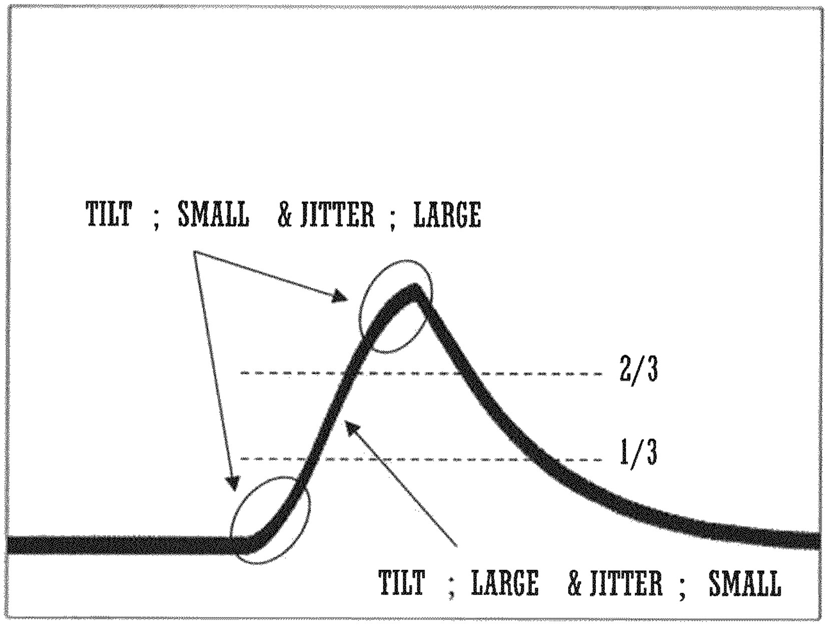
FIG. 7 is a graph showing a state of jitter in a detection signal of an optical sensor.

Next, as in an actual measurement value illustrated in FIG. 7, when the output signal of the BD sensor 10 has small voltage (e.g., ⅓ or less of the peak voltage) and is close to the peak (e.g., ⅔ or more of the peak voltage), the waveform has small tilt and large jitter. It is not preferable to set these values as a threshold level because it leads to different detection timings each time and so generates displacement of the starting position to write an image.

On the other hand, when the output signal of the BD sensor has medium voltage (e.g., ⅓ to ⅔ of the peak voltage), the waveform has large tilt and small jitter. Setting these values as a threshold level does not cause displacement of the starting position to write an image because the detection timing can be always the same.

Then, the present invention sets an intermediate value (e.g., ⅓ to ⅔ of the peak voltage) of the output signal waveform of the BD sensor as a threshold level.

The aforementioned two processes can keep the detection timing of a light beam from changing even when the light amount of a light beam changes. This means that the starting position to write an image is not displaced, and so writing of an image can be started always from the same position.

Figure 8:
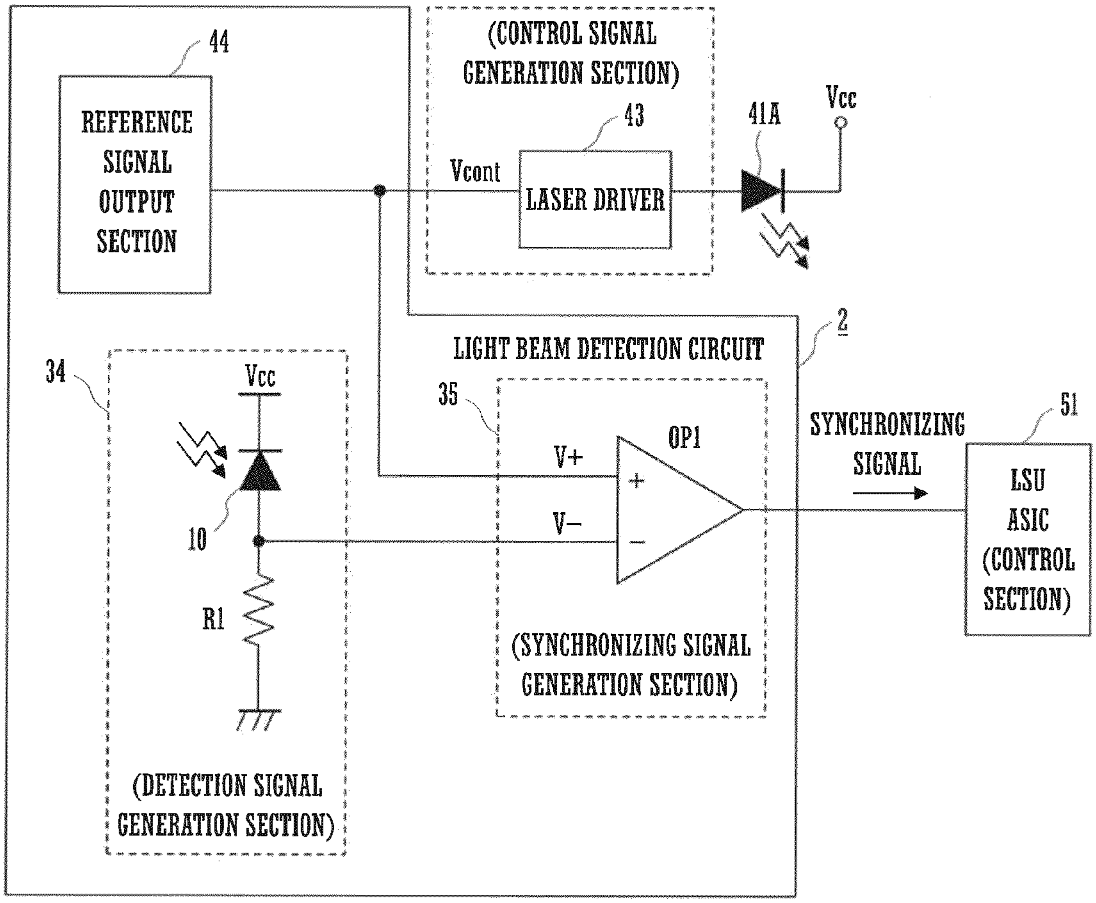
FIG. 8 is a circuit diagram of a light beam detection circuit to use control voltage of a laser driver as a threshold level.

Next, the present invention includes a light beam detection circuit of FIG. 8 to detect a light beam. The present invention is configured to use a light-amount control signal of a semiconductor laser as a light-emitting element, i.e., voltage in proportion to control voltage (Vcont) to be input to a laser driver, as a threshold level. The semiconductor laser emits a laser beam of a light amount corresponding to the light-amount control signal, and an optical sensor (BD sensor) outputs a detection signal of the magnitude corresponding to the light amount of the laser beam. That is, since the light-emission amount from the semiconductor laser and the amount of received light of the optical sensor have a proportional relationship, a threshold level (reference signal) is changed in proportion to the light amount of a light beam by setting the threshold level as stated above. This means that a light beam can be detected always precisely at the same timing even when the light amount of a light beam changes, and so a problem of displacement of the starting position to write an image can be prevented. This further can suppress cost because only one optical sensor is required.

The threshold level can be set in accordance with the magnitude of an output signal of the BD sensor 10 by the following three ways.

(1) Using Control Voltage Vcont

When voltage of the control voltage Vcont to be input to the laser driver 43 can be used as a threshold level without changing, this control voltage Vcont is input as the threshold level as illustrated in FIG. 8.

In the example of FIG. 8, when the light beam detection circuit 2 inputs control voltage Vcont(=1.0V) to the laser driver 43, the semiconductor laser 41A emits a laser beam and the BD sensor 10 receives the laser beam. At this time, the light-amount at the image surface, i.e., the amount of received light at the BD sensor 10 is 150 μW, and the output signal of the detection signal generation section 34 is up to 2.0 V. Since the control voltage cont is about ½ of the maximum output signal of the detection signal generation section 34, there is no need to change the voltage value of the control voltage Vcont. Then, the light beam detection circuit is configured so that the control voltage Vcont is input to the non-inverting input terminal of the comparator OP1 as a reference signal that is in proportion to the light-amount control signal of the semiconductor laser 41A as a light-emitting element.

This configuration makes the comparator OP1 output a synchronizing signal to the ASIC 51 when the signal exceeds ½ of the maximum output signal of the BD sensor 10 irrespective of the amount of emitted light of the laser beam of the semi conduct or laser 41A and the amount of received light of the BD sensor 10. Then, the ASIC 51 as a control section determines the scanning starting position (irradiation starting position) of a light beam based on this synchronizing signal.

In FIG. 8, the laser driver 43 corresponds to the control signal generation section. The BD sensor 10 and a resistor R1 correspond to the detection signal generation section 34. The comparator OP1 corresponds to the synchronizing signal generation section 35.

(2) Using Voltage Higher Than One in Proportion to Control Voltage (Vcont)

Figure 9:
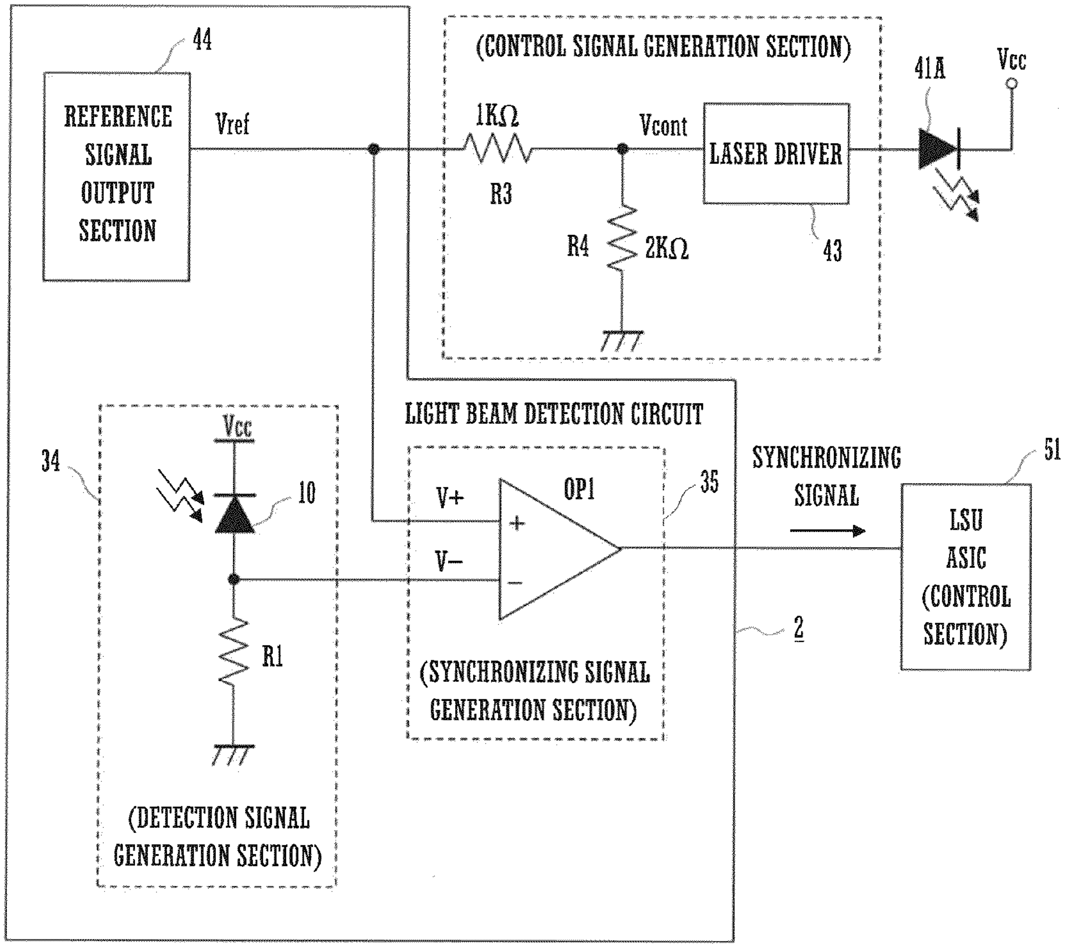
FIG. 9 is a circuit diagram of a light beam detection circuit to use voltage higher than one in proportion to control voltage of a laser driver as a threshold level.

When a threshold level is set at a value closer to the peak of the output signal of the detection signal generation section 34, voltage higher than one in proportion to the control voltage Vcont is input as the threshold level as illustrated in FIG. 9.

In the example of FIG. 9, when the light beam detection circuit 2 inputs control voltage Vcont(=1.0V) to the laser driver 43, the semiconductor laser 41A emits a laser beam and the BD sensor 10 receives the laser beam. At this time, the amount of received light at the image surface, i.e., the amount of received light at the BD sensor 10 is 100 μW, and the output signal of the detection signal generation section 34 is up to 2.25 V. When the threshold level is to be set at a value that is ⅔ of the maximum output signal of the detection signal generation section 34, for example, due to reasons such as increase of detection accuracy, the circuit is configured so that the voltage at the non-inverting input terminal of the comparator OP1 is Vref=1.5V. That is, as illustrated in FIG. 9, voltage Vref output from the reference signal output section 44 is divided by a resistor R3 of 1 kΩ and a resistor R4 of 2 kΩ, thus setting the control voltage Vcont at 1.0 V.

This configuration makes the comparator OP1 output a synchronizing signal to the ASIC 51 when the signal exceeds ⅔ of the maximum output signal of the BD sensor 10 irrespective of the amount of emitted light of the laser beam of the semiconductor laser 41A and the amount of received light of the BD sensor 10. Then, the ASIC 51 determines the scanning starting position (irradiation starting position) of a light beam based on this synchronizing signal.

In FIG. 9, the laser driver 43, the resistor R3 and the resistor R4 correspond to the control signal generation section. The BD sensor 10 and the resistor R1 correspond to the detection signal generation section 34. The comparator OP1 corresponds to the synchronizing signal generation section 35.

(3) Using Voltage Lower Than One in Proportion to Control Voltage (Vcont)

Figure 10:
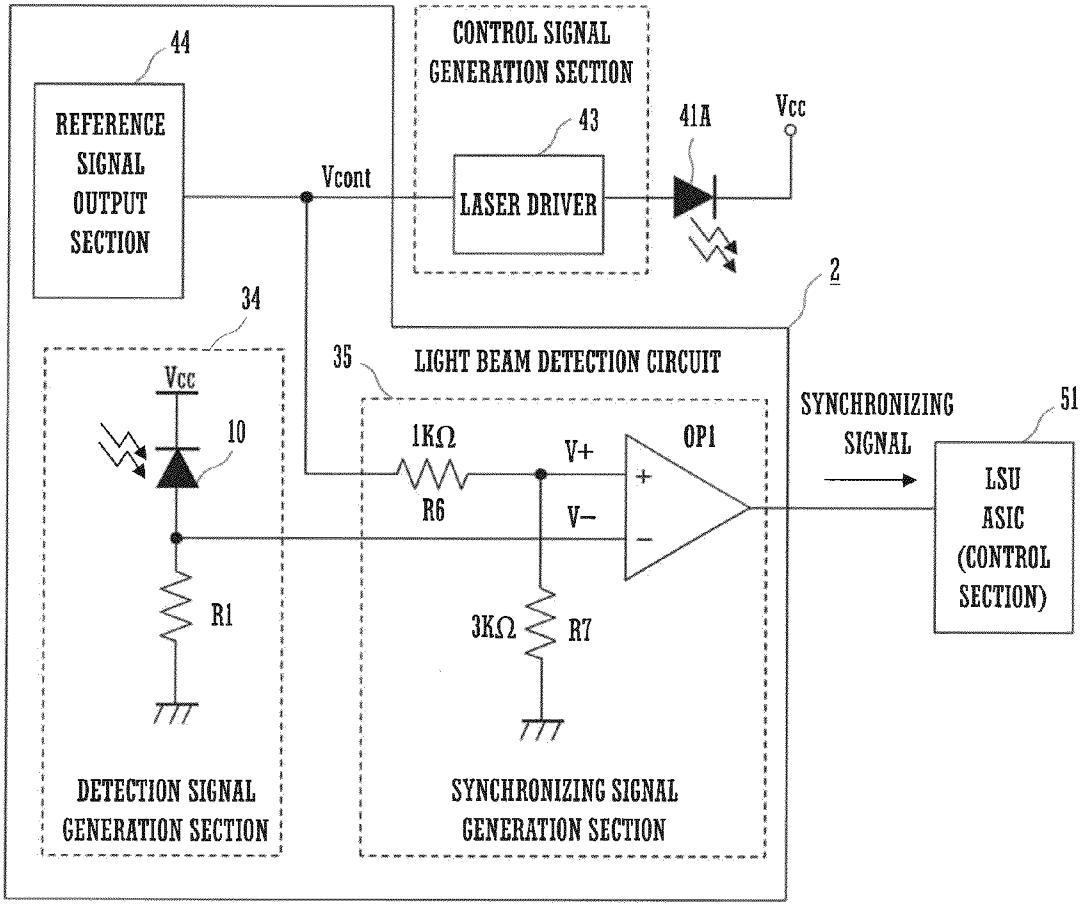
FIG. 10 is a circuit diagram of a light beam detection circuit to use voltage lower than one in proportion to control voltage of a laser driver as a threshold level.

When a threshold level is set at a value farther away from the peak of the output signal of the detection signal generation section 34, voltage lower than one in proportion to the control voltage Vcont is input as the threshold level as illustrated in FIG. 10.

In the example of FIG. 10, when the light beam detection circuit 2 inputs control voltage Vcont(=1.0V) to the laser driver 43, the semiconductor laser 41A emits a laser beam and the BD sensor 10 receives the laser beam. At this time, the amount of received light at the image surface, i.e., the amount of received light at the BD sensor 10 is 200 μW, and the output signal of the detection signal generation section 34 is 2.25 V at maximum. When the threshold level is to be set at a value that is ⅓ of the maximum output signal of the detection signal generation section 34, for example, due to reasons such as increase of detection accuracy, the circuit is configured so that the voltage value at the non-inverting input terminal of the comparator OP1 is 0.75V. That is, as illustrated in FIG. 10, control voltage Vcont(=1.0 V) output from the reference signal output section 44 is divided by a resistor R6 of 1 kΩ and a resistor R7 of 3 kΩ, thus setting the voltage at the non-inverting input terminal of the comparator OP1 at 0.75 V.

This configuration makes the comparator OP1 output a synchronizing signal to the ASIC 51 when the signal exceeds ⅓ of the maximum output signal of the BD sensor 10 irrespective of the amount of emitted light of the laser beam of the semiconductor laser 41A and the amount of received light of the BD sensor 10. Then, the ASIC 51 determines the scanning starting position (irradiation starting position) of a light beam based on this synchronizing signal.

In FIG. 10, the laser driver 43 corresponds to the control signal generation section. The BD sensor 10 and the resistor R1 correspond to the detection signal generation section. The comparator OP1, the resistor R6 and the resistor R7 correspond to the synchronizing signal generation section.

As stated above, the circuit is configured to change a threshold level in proportion to a detection signal of one BD sensor, whereby a light beam can be detected always at the same timing (same positron). This can keep the starting position to write an image constant. Further, only one optical sensor (BD sensor) is required for detection of a laser beam, and so cost of the apparatus can be suppressed.

REFERENCE SIGNS LIST

1 Light beam scan unit
2 Light beam detection circuit
31 Scanning section
34 Detection signal generation section
35 Synchronizing signal generation section
41A to 41D Semiconductor laser
43 Laser driver
44 Reference signal output section
51 LSU_ASIC
71 CPU
84 Temperature sensor
85 Humidity sensor
100 Color printer
101A to 101D Photoreceptor drum

The invention claimed is:

1. A light beam detection circuit, comprising:
a detection signal generation section configured to receive a light beam for scanning of a scanning target with one optical sensor, and generate a detection signal corresponding to an amount of received light;
a reference signal output section configured to output a reference signal that is in proportion to a light-amount control signal of a light-emitting element that emits the light beam; and
a synchronizing signal generation section configured to compare the detection signal generated by the detection signal generation section with the reference signal output from the reference signal output section to generate a synchronizing signal to determine a position to start scanning of the scanning target with the light beam; wherein
a value of the reference signal is an intermediate value of a waveform of an output signal of the one optical sensor.

2. The light beam detection circuit according to claim 1, wherein the reference signal output section outputs the light-amount control signal as the reference signal.

3. A light beam scan unit, comprising:
the light beam detection circuit according to claim 2;
a control signal generation section configured to generate the light-amount control signal;
a light source section configured to let the light-emitting element emit a light beam of a light amount corresponding to the light-amount control signal;
a scan section configured to scan the scanning target with a light beam emitted from the light source section; and
a control section configured to determine a scan starting position of the light beam for scanning by the scan section based on a synchronizing signal generated by the synchronizing signal generation section.

4. The light beam scan unit according to claim 3, further comprising a detection section configured to detect an ambient temperature or an ambient humidity of a main body of the unit, wherein
the control signal generation section generates a light-amount control signal depending on the ambient temperature or the ambient humidity detected by the detection section.

5. An image forming apparatus, comprising:
the light beam scan unit according to claim 4;
an image forming section configured to supply toner to an electrostatic latent image that is formed on a scanned face of a photoreceptor as the scanning target by scanning with the light beam by the light beam scan unit so as to make the electrostatic latent image visible; and
a fixing section configured to transfer a toner image made to be visible by the image forming section to a recording member and fix the same.

6. The light beam scan unit according to claim 3, wherein the scan section includes a measurement section configured to measure the number or time of scans of the scanning target with a light beam by the scan section, and the control signal generation section generates the light-amount control signal depending on the number or time measured by the measurement section.

7. An image forming apparatus, comprising:

the light beam scan unit according to claim 6;

an image forming section configured to supply toner to an electrostatic latent image that is formed on a scanned face of a photoreceptor as the scanning target by scanning with the light beam by the light beam scan unit so as to make the electrostatic latent image visible; and a fixing section configured to transfer a toner image made to be visible by the image forming section to a recording member and fix the same.

8. An image forming apparatus, comprising:

the light beam scan unit according to claim 3;

an image forming section configured to supply toner to an electrostatic latent image that is formed on a scanned face of a photoreceptor as the scanning target by scanning with the light beam by the light beam scan unit so as to make the electrostatic latent image visible; and a fixing section configured to transfer a toner image made to be visible by the image forming section to a recording member and fix the same.

9. A light beam scan unit, comprising:

the light beam detection circuit according to claim 1;

a control signal generation section configured to generate the light-amount control signal;

a light source section configured to let the light-emitting element emit a light beam of a light amount corresponding to the light-amount control signal;

a scan section configured to scan the scanning target with a light beam emitted from the light source section; and a control section configured to determine a scan starting position of the light beam for scanning by the scan section based on the synchronizing signal generated by the synchronizing signal generation section.

10. The light beam scan unit according to claim 9, further comprising a detection section configured to detect an ambient temperature or an ambient humidity of a main body of the unit, wherein the control signal generation section generates a light-amount control signal depending on the ambient temperature or the ambient humidity detected by the detection section.

11. An image forming apparatus, comprising:

the light beam scan unit according to claim 10;

an image forming section configured to supply toner to an electrostatic latent image that is formed on a scanned face of a photoreceptor as the scanning target by scanning with the light beam by the light beam scan unit so as to make the electrostatic latent image visible; and a fixing section configured to transfer a toner image made to be visible by the image forming section to a recording member and fix the same.

12. The light beam scan unit according to claim 9, wherein the scan section includes a measurement section configured to measure the number or time of scans of the scanning target with a light beam by the scan section, and the control signal generation section generates the light-amount control signal depending on the number or time measured by the measurement section.

13. An image forming apparatus, comprising:

the light beam scan unit according to claim 12;

an image forming section configured to supply toner to an electrostatic latent image that is formed on a scanned face of a photoreceptor as the scanning target by scanning with the light beam by the light beam scan unit so as to make the electrostatic latent image visible; and a fixing section configured to transfer a toner image made to be visible by the image forming section to a recording member and fix the same.

14. An image forming apparatus, comprising:

the light beam scan unit according to claim 9;

an image forming section configured to supply toner to an electrostatic latent image that is formed on a scanned face of a photoreceptor as the scanning target by scanning with the light beam by the light beam scan unit so as to make the electrostatic latent image visible; and a fixing section configured to transfer a toner image made to be visible by the image forming section to a recording member and fix the same.

* * * * *